United States Patent
Ma et al.

(10) Patent No.: US 7,284,150 B2
(45) Date of Patent: Oct. 16, 2007

(54) SYSTEM AND METHOD FOR RELIABLY STORING DATA AND PROVIDING EFFICIENT INCREMENTAL BACKUP AND ASYNCHRONOUS MIRRORING BY PREFERENTIALLY HANDLING NEW DATA

(75) Inventors: Xiaonan Ma, Sunnyvale, CA (US); Windsor Wee Sun Hsu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/711,506

(22) Filed: Sep. 22, 2004

(65) Prior Publication Data
US 2006/0075294 A1    Apr. 6, 2006

(51) Int. Cl.
*G06F 11/00*    (2006.01)
(52) U.S. Cl. .............................. 714/6; 711/161; 711/162
(58) Field of Classification Search .................... 714/6; 711/161, 162
See application file for complete search history.

(56) References Cited

U.S. PATENT DOCUMENTS

| | | | |
|---|---|---|---|
| 5,594,900 A | 1/1997 | Cohn et al. | |
| 5,764,877 A | 6/1998 | Lomet et al. | |
| 6,148,383 A * | 11/2000 | Micka et al. | 711/162 |
| 6,199,074 B1 | 3/2001 | Kern et al. | |
| 6,253,295 B1 * | 6/2001 | Beal et al. | 711/162 |
| 6,282,610 B1 | 8/2001 | Bergsten | |
| 6,467,034 B1 | 10/2002 | Yanaka | |
| 6,493,796 B1 | 12/2002 | Arnon et al. | |
| 6,499,091 B1 * | 12/2002 | Bergsten | 711/162 |
| 6,502,205 B1 | 12/2002 | Yanai et al. | |
| 6,678,107 B1 | 1/2004 | Krehbiel et al. | |
| 6,718,352 B1 * | 4/2004 | Dang et al. | 707/205 |
| 7,117,386 B2 * | 10/2006 | LeCrone et al. | 714/6 |
| 2003/0126387 A1 * | 7/2003 | Watanabe | 711/161 |

* cited by examiner

*Primary Examiner*—Michael Maskulinski
(74) *Attorney, Agent, or Firm*—Mark C. McCabe; Lewis L. Nunnelley

(57) ABSTRACT

According to the present invention, there is provided a method for reliably storing data in a computer system. The method includes receiving a piece of data to be stored at a storage system. In addition, the method includes writing a first copy of the data to the storage system according to a first data redundancy scheme. Also, the method includes writing a second copy of the data to the storage system according to a second data redundancy scheme. Also, the system includes maintaining metadata of the data written to the storage system according to the second data redundancy scheme. In addition, the method includes copying the data written to the storage system according to the second data redundancy scheme to a backup storage system, wherein the copying is performed in response to a defined condition being met. Moreover, removing the data written to the storage system according to the second data redundancy scheme after it has been copied to the backup storage system.

9 Claims, 8 Drawing Sheets

SYSTEM AND METHOD FOR RELIABLY STORING DATA AND PROVIDING EFFICIENT INCREMENTAL BACKUP AND ASYNCHRONOUS MIRRORING BY PREFERENTIALLY HANDLING NEW DATA

FIELD OF THE INVENTION

The present invention relates to a new integrated data storage method and system for providing high availability of data, efficient true incremental backup, fast restart after failure and efficient performance of integrated asynchronous remote copy.

BACKGROUND OF THE INVENTION

Data is one of the most important assets of an organization especially as organizations rely more and more on data processing systems for their daily operations. Any loss of data or even loss of access to the data is therefore potentially very costly. For example, an hour of down time for a system handling brokerage operations has been estimated to cost eight million dollars.

Current methods for preventing data loss include using RAID (redundant arrays of inexpensive disks) Using RAID protection alone is, however, not sufficient or cost effective. Furthermore, the industry and technology trends (e.g., building cost-effective storage systems with low-end SATA disks) are such that increasingly higher degrees of redundancies are needed, which is costly both in terms of dollars and performance. RAID protection is therefore typically augmented by periodically copying the data onto a secondary system such as a tape library in a process referred to as backup. When the primary system fails, the data can be retrieved from the secondary system through a process called restore. If the data is copied to a system that is geographically separated from the primary system, the data will be available to allow the organization to continue its business even after a disaster at the primary site. This is usually referred to as remote copying or mirroring. A straightforward approach for backup and restore is to blindly (i.e. without considering the block contents) perform a block-by-block copy from the primary system to the secondary system and vice versa. This, however, results in a lot of unnecessary data copying which wastes processing and network bandwidth. In addition, backup and restore have to be performed on entire volumes of data. As both the retention period and the amount of data stored grow, such an approach is increasingly impractical.

An alternative is to perform the backup at the file level in which case the system knows when a file was last updated so that it can choose to backup only those files that have been updated since the last backup. Backing up only the updated files is called incremental backup. File-level backup also makes it possible to selectively backup and restore files. Backing up only the updated files does not, however, work well for important applications such as databases that store data in very large files. This is because an entire file is transferred to the secondary system even when only a single byte of that file is changed. Ideally, we want the system to perform "true" incremental backup, copying to the secondary system only the portions of the data that have actually changed. Detecting the changed portions is however difficult and requires substantial processing and I/O. For example, the system would have to keep previous versions of the data or summaries (e.g., hash values) of previous versions, and perform comparisons. Besides the problems outlined above, current approaches for data protection work independently, often performing a lot of redundant processing (e.g., backup and remote copy). More importantly, they do not offer a holistic or integrated way to manage and reduce data loss. For instance, RAID protects all the data in an array to the same extent even though some are more important (e.g., more recently written) and some have already been backed up. This is clearly not optimal from the overall perspective of reducing data loss. There remains therefore a great need for a holistic approach to reliably store data and to efficiently perform true incremental backup and remote copy. The present invention satisfies this need by preferentially handling data that has yet to be copied to a secondary system.

SUMMARY OF THE INVENTION

According to the present invention, there is provided a method for reliably storing data in a computer system. The method includes receiving a piece of data to be stored at a storage system. In addition, the method includes writing a first copy of the data to the storage system according to a first data redundancy scheme. Also, the method includes writing a second copy of the data to the storage system according to a second data redundancy scheme. Also, the system includes maintaining metadata of the data written to the storage system according to the second data redundancy scheme. In addition, the method includes copying the data written to the storage system according to the second data redundancy scheme to a backup storage system, wherein the copying is performed in response to a defined condition being met. Moreover, removing the data written to the storage system according to the second data redundancy scheme after it has been copied to the backup storage system.

DETAILED DESCRIPTION

The invention will be described primarily as a system and method for reliably storing data in a computer system. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

The invention provides for high availability of all data, including newly written data. High availability is provided through protecting against data loss by considering the total number of copies of the data in a storage system, which may encompass both local (e.g. disk array, tape library) and remote (remote mirror, backup system) storage devices, and how reliable each copy is.

Also, the invention provides for true incremental backup. Only data which has changed since previous backup is backed up, and the backup is performed without the need to perform comparisons to identify the changes. In addition, the invention provides for fast restart after failure. Fast restart after failure includes efficient retrieval of individual files, allowing important files (e.g., recently accessed) to be recovered first. Moreover, the invention provides for integrated asynchronous remote copy, including the ability to quickly identify changes in the data to efficiently perform asynchronous remote copy.

In a storage system, the reliability requirement is different for data that has already been backed up and data which has not been backed up. This is true, because the probability that there will be concurrent failures of both the local storage and the backup storage is smaller than a failure of the local storage alone. Also, having one or more backup copies of the data (in backup storage) is more reliable than having one or more local copies (in local storage) of the data.

Architectural Overview

Figure 1:
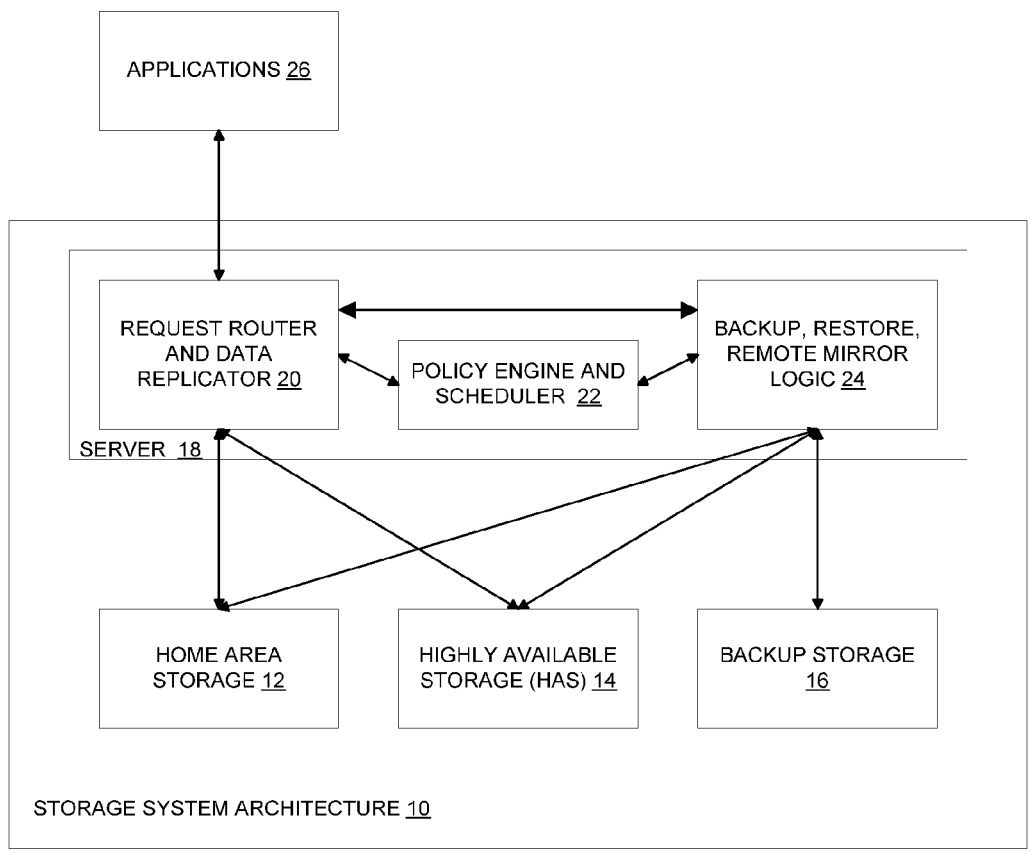
FIG. 1 is a block diagram illustrating a storage system architecture, according to one embodiment of the invention.

FIG. 1 is a block diagram illustrating a storage system architecture 10 including a home storage system 12, a highly available storage (HAS) system 14, and one or more backup storage systems 16, some of which may be remote. Architecture 10 includes server 18. Server 18 includes a request router and data replicator 20, a policy engine and scheduler 22, and backup, restore, and remote mirror logic 24.

The data stored in home storage 12 is protected with common data redundancy schemes such as RAID-5. The data in HAS 14 is protected to a much higher reliability requirement using, for instance, N-way mirroring, which can be implemented by stacking RAID-1 layers such that N copies are maintained for each piece of data. In one embodiment, the backup storage systems 16 include at least one tape library. In another embodiment, the backup storage systems 16 include at least a remote mirror.

When data is written, the request router/data replicator 20 stores the newly written data in both the home storage 12 and the highly available storage (HAS) 14. The policy engine and scheduler 22 determines when a defined condition is met at which point backup logic 24 is used to send the newly written data to a backup system 16 determined by the satisfied condition.

Only those newly written data (updates) which have not been backed up are sent to the backup system. Sending the updates to backup system 24 does not require making a comparison between data in home storage 12 and data in backup system 24. Because the data is stored on HAS 14 before being sent to backup system 24, such data is better protected against potential data loss. After the data has been backed up, it is removed from HAS storage 14.

When home storage 12 fails, the server 18 restores the data that was on home storage 12 from the backup systems 16. It then applies the recent updates stored in HAS 14 to the restored data. This ensures that no data is lost when home storage 12 fails.

Figure 2:
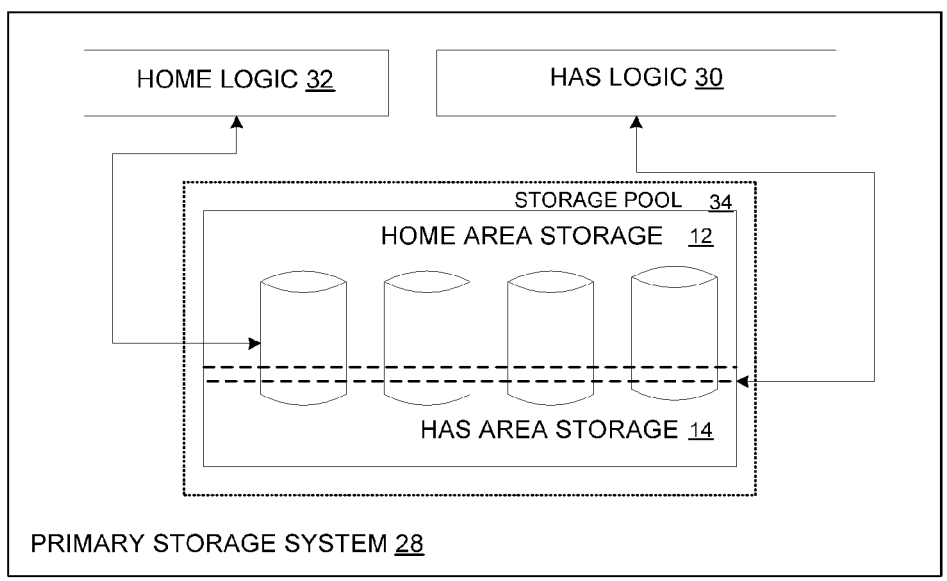
FIG. 2 shows a primary storage system included within a storage system architecture, according to one embodiment of the invention.

FIG. 2 shows a primary storage system included within architecture 10, according to one embodiment of the invention. The home area storage 12 and HAS 14 are part of a primary storage system 28 which includes HAS logic 30, home logic 32, and a storage pool 34 made up of a group of storage devices.

In primary storage system 28, storage pool 34 is divided into two areas, home area storage 12 and HAS area storage 14. Storage can be divided either physically, by using separate physical disks for home area storage 12 and HAS area storage 14; or logically by partitioning spaces on the same set of physical disks between home area storage 12 and HAS area storage 14.

When new data is written, the updates are stored at HAS storage area 14 via HAS logic 30. In addition, the updates are written to home storage area 12 via home logic 32.

In a preferred embodiment of the system, the data is logically grouped into files and attributes such as names are associated with the files. In addition, operations are permitted on both the data in the files and on the attributes of the files.

Figure 3:
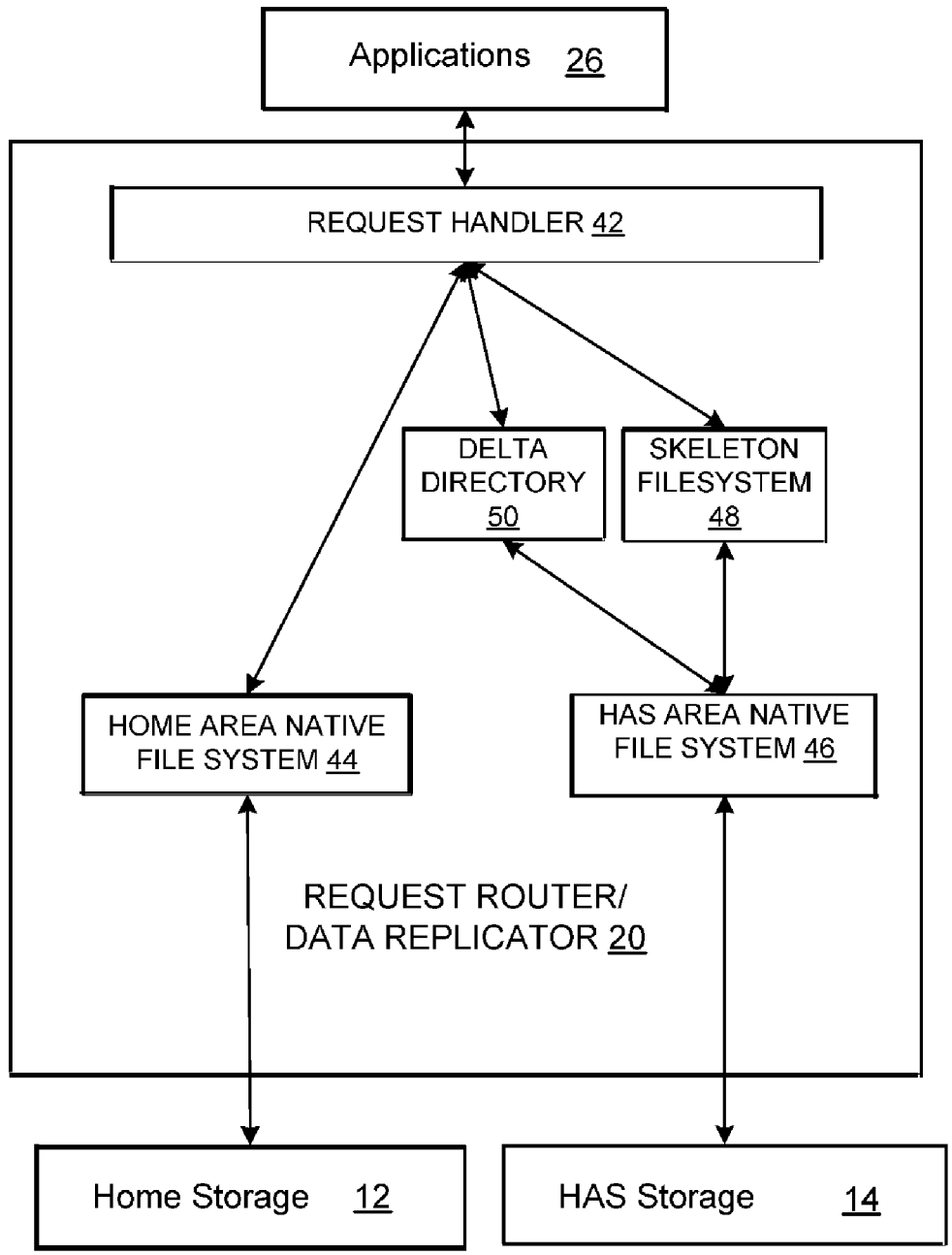
FIG. 3 is a block diagram illustrating a request router/data replicator according to an embodiment of the invention.

FIG. 3 is a block diagram illustrating the request router/data replicator 20 for this preferred embodiment of the invention. The request router/data replicator includes request handler 42, home area native file system 44, skeleton file system 48, delta directory 50, and HAS area native file system 46.

In one embodiment, there is a server that acts as a failover node for the primary storage system 28. Data is sent to this failover server to achieve asynchronous remote mirroring. If the failover server is placed physically far away, it can survive disaster at the primary site. Remote mirroring can be implemented at the logical file level for better flexibility because there is no dependence on any physical characteristics of different systems. In addition, the system has the ability to restore individual files, this allowing fast selective restore of important data.

Keeping Track of the Updates

Request router/data replicator 20 maintains enough information in HAS storage area 14 so that no data is lost when home area storage 12 fails, as long as HAS storage area 14 and backup storage 16 are still available.

Skeleton File System

Storing the data updates to HAS storage area 14 is not difficult. The difficulty lies in being able to access the data updates at HAS storage area 14, and to merge them with the data restored from backup storage system 16 when home storage area 12 fails. To solve this problem, request router/data replicator 20 maintains skeleton file system 48. Skeleton file system 48 replicates all the namespace and attribute information maintained by home area native file system 44.

The size of file system metadata is typically only a very small fraction of the size of user data. Furthermore, skeleton file system 48 only replicates part of the metadata of home area native file system 44 (as described below, files in skeleton file system 48 do not contain any actual data so there is no per file block allocation map). Therefore, the storage overhead of maintaining skeleton file system 48 is small.

Figure 4:
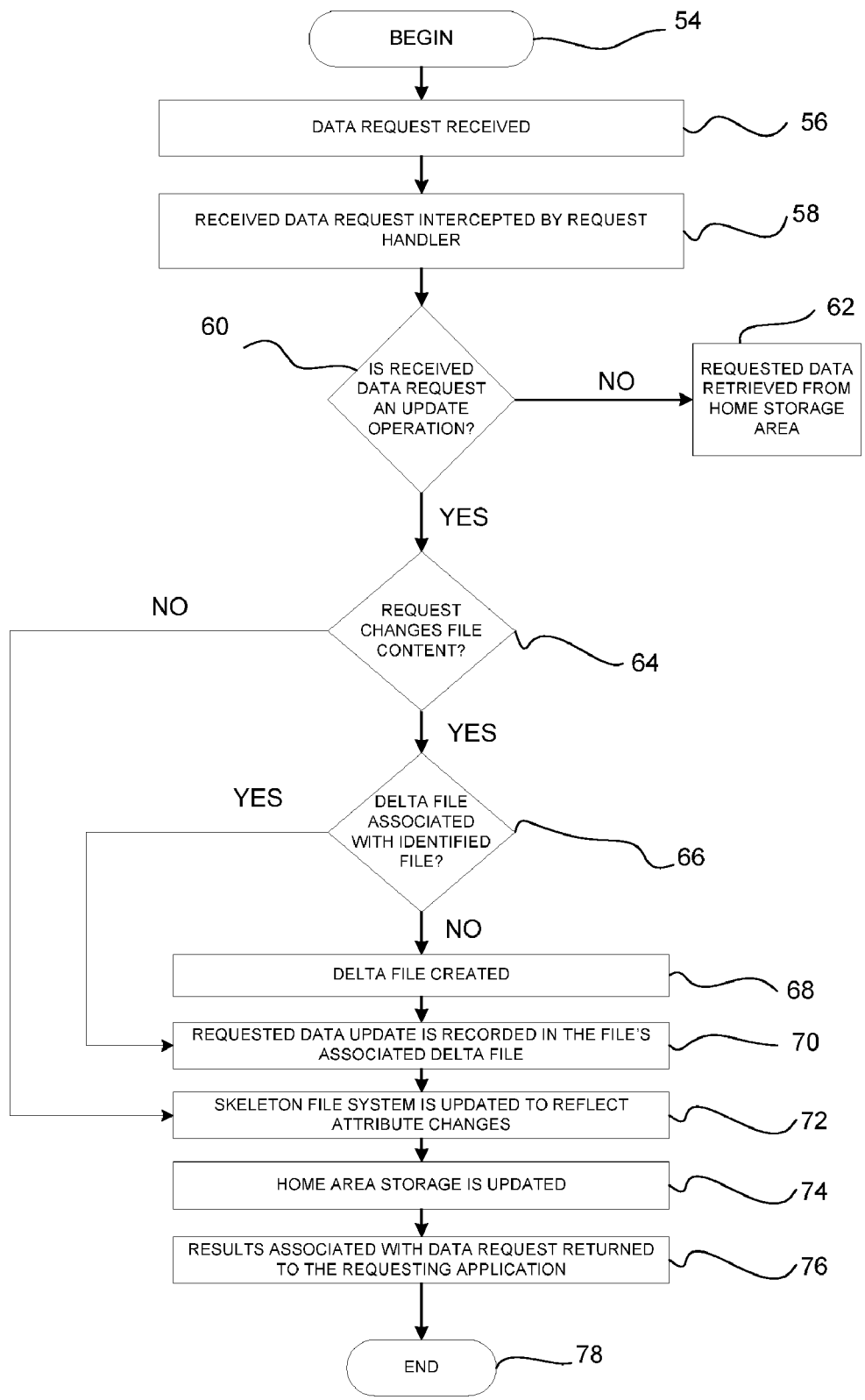
FIG. 4 is a flowchart illustrating a method of handling data requests in a storage system architecture.

FIG. 4 is a flowchart illustrating a method 52 of handling data requests in architecture 10, according to an exemplary embodiment of the invention. At block 54, method 52 begins.

At block 56, application 26 sends a data request to request router/data replicator 20.

At block 58, the data request is intercepted by request handler 42. In one embodiment, request handler 42 is implemented as a stackable file system and is inserted above the native file systems (Home area native file system 44 and HAS area native file system 46). Native file system 44 works with home area logic 32 to manage home area storage 12. Native file system 46 works with HAS area logic 30 to manage HAS area storage 14. Native file system 44 and native file system 46 can be two different file system implementations, as long as application 26 does not rely on file system specific features. Application 26 recognizes only one file system. The HAS area native file system 46, HAS area logic 30, and HAS area storage 14 are transparent to application 26.

At block 60, a determination is made as to whether the data request is an update operation. If no, then at block 62 the requested data is retrieved from home storage area 12. Update operations include: namespace updates (e.g., rename), attribute updates (e.g., chmod) and user data updates (e.g., write). Operations updating the file system namespace typically also require changes to the attribute information, but not the other way around.

Returning to block 60, if yes, the file to be updated is identified and a determination is made at block 64, as to whether the request will change the content of the file.

At block 66, a determination is made as to whether a delta file is associated with the identified file. If no, then at block 68, a delta file to be associated with the identified file is created.

At block 70, requested data update is recorded in the file's associated delta file within delta directory 50. The data maintained in the associated delta file is stored at HAS area storage 14.

At block 72, skeleton file system 48 is updated to reflect changes in attributes associated with the updated file.

At block 74, home area native file system 44 in coordination with home area logic 32, updates home storage area 12.

At block 76, results associated with the received data request are returned to application 26. The original operation is not considered complete and control does not return to application 26 until HAS area native file system 46 and home area native file system 44 have both completed their tasks.

At block 78, method 52 ends.

Delta Directories and Delta Files

While the system can afford to replicate all the namespace and attribute information of the home area in skeleton file system 48, the overhead of replicating all the user data on HAS area storage 14 is prohibitive. Therefore, user data recorded in HAS area storage 14 are removed as soon as they have been backed up to backup storage system 16.

In order to remove user data from HAS area storage 14 after they are backed up, the simplest approach is to manage the data updates according to backup epochs. A backup epoch is defined as the time period between two adjacent backup operations.

If the system simply writes the new data into skeleton file system 48, then updates to a file from different backup epochs will be merged together into a single file in skeleton file system 48. Not only does this make removing updates from a particular backup epoch more complicated, it also requires support from skeleton file system 48 to remove data segments from the middle of a file, which is not available in most file systems today. Because of this, instead of writing the new data into skeleton file system 48, the system records the new data in places on HAS area storage 14 that are outside of skeleton file system 48.

In a preferred embodiment, for home area storage 12, request handler 42 simply forwards the data update operations to home area native file system 44. For HAS area storage 14, request handler 42 maintains one directory (called delta directory) for each backup epoch whose backup procedure has not completed.

All the data updates to a file during a particular backup epoch will be recorded in one file (called delta file) under the corresponding delta directory. Within each backup epoch there is an one-to-one mapping between a file and its delta file. In one embodiment, a delta file is named with the file's file system ID (e.g., its inode number) in skeleton file system 48.

Since the delta files only contain data updates during a backup epoch, which may be partial file updates, one simple way to maintain the delta files is to take advantage of the sparse file support from file systems. However, since most file systems do not provide an interface for exposing a file's data layout (i.e., there is no easy way to find out which parts of a sparse file contain holes), it may be necessary to maintain a data structure which contains such information for each delta file. Such a data structure, called update map, allows the system to merge a delta file with the previous version of the file restored from backup storage system 16 to produce an up to-date version of the file. In addition, the update maps also helps to backup the delta files efficiently since most file-level backup solutions today do not handle sparse files correctly (due to the same reason as mentioned above regarding the lack of data layout information from most file systems for sparse files). The update map can either be stored inside the delta file (e.g., as a header) or outside the delta file.

Full Backup

Figure 5:
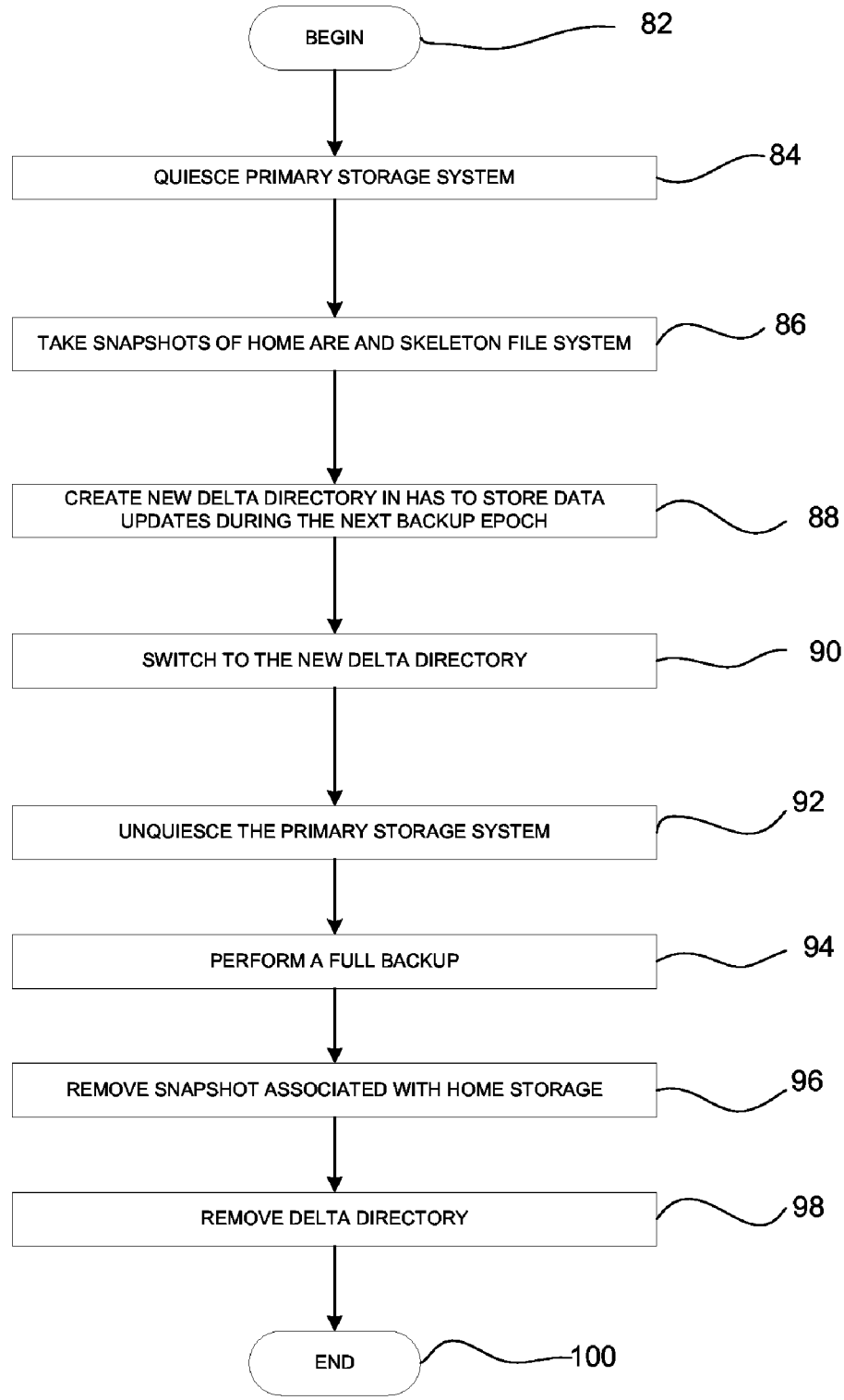
FIG. 5 is a flowchart illustrating a method of performing a full backup of a primary storage within a storage system architecture.

FIG. 5 is a flowchart illustrating a method 80 of performing a full backup of primary storage system 28. At block 82, method 80 begins.

At block 84, request handler 42 is quiesced which in turn will cause home area native file system 44 and HAS area native file system 46 to be quiesced.

At block 86, block-level snapshots, i.e. point-in-time images of the data, are taken for both the home area 12 and the part of HAS area storage 14 that is allocated to skeleton file system 48 (such snapshot facility is readily available in today's storage systems).

At block 88, a new delta directory 50 is created in HAS logic 30 to store data updates during the next backup epoch.

At block 90, switch to the new delta directory 50.

At block 92, unquiesce request handler 42 which will unquiesce home area native file system 44 and HAS area native file system 46.

At block 94, perform a full backup using the snapshot taken of home storage area 12.

At block 96, after it has been backed up to backup storage system 16, remove the snapshot of home storage area 12.

At block 98, remove the delta directory and all of the delta files beneath it, after the backup is complete. The snapshot of skeleton file system 48 is not removed after the full backup, since the system needs to retain enough information about the current snapshot for the next incremental backup. In one embodiment, the previous snapshot of skeleton file system 48 is retained until the next backup. In another embodiment, all necessary metadata information contained in the snapshot is recorded before the snapshot is deleted.

At block 100, method 80 ends.

Incremental Backup

Figure 6:
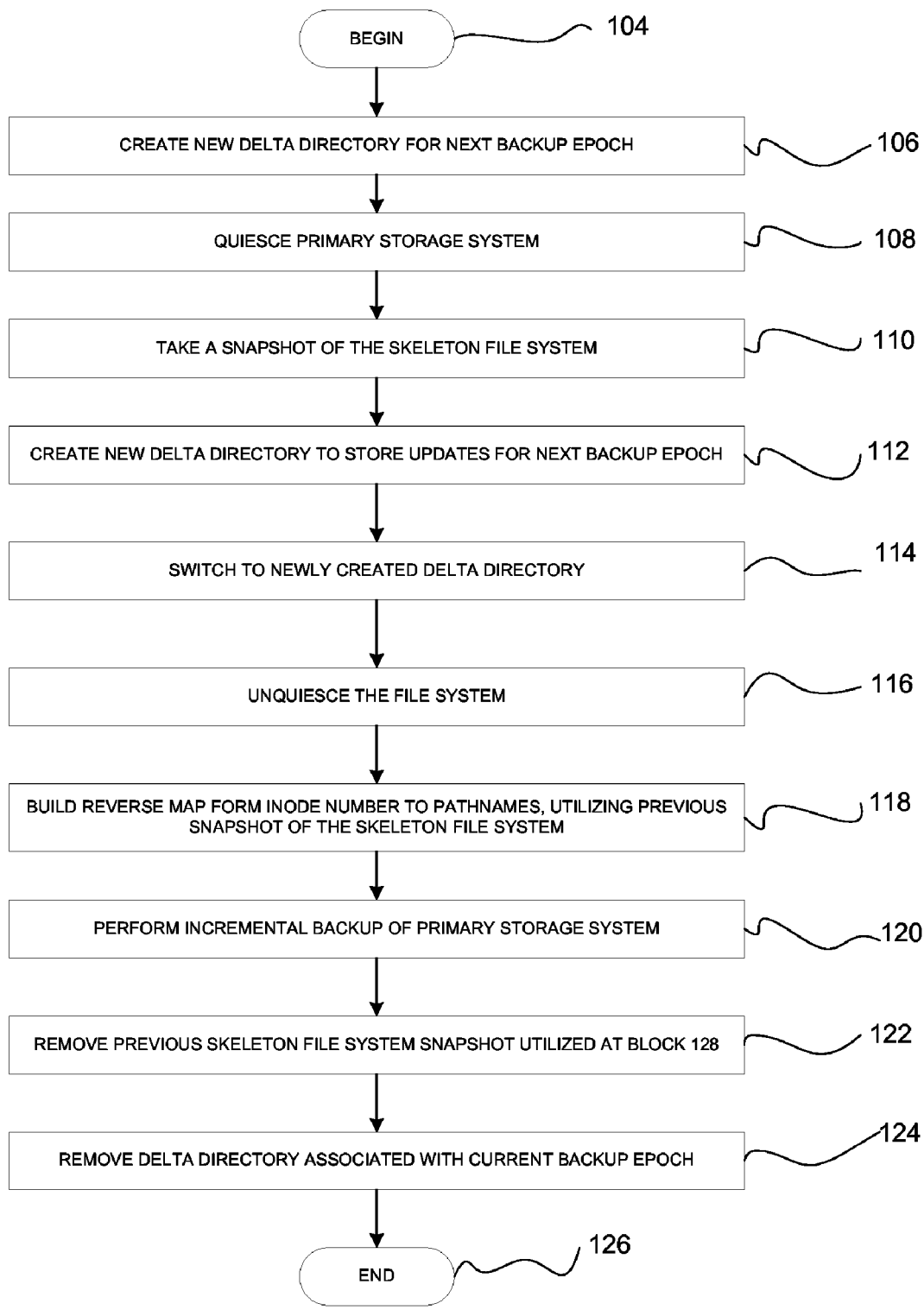
FIG. 6 is a flowchart illustrating a method of performing an incremental backup of storage system architecture's primary storage system.

FIG. 6 is a flowchart illustrating a method 102 of performing an incremental backup of primary storage system 28. At block 104, method 102 begins.

At block 106, a new delta directory is created for the next backup epoch.

At block 108, request handler 42 is quiesced which in turn will cause home area native file system 44 and HAS area native file system 46 to be quiesced.

At block 110, take a block-level snapshot of skeleton file system 48.

At block 112, similar to the case of a full backup, a new delta directory is created to store data updates for the next backup epoch. Note, however, that there is no need to take a snapshot of the home area storage 12.

At block 114, switch to the newly created delta directory.

At block 116, unquiesce request handler 42 which will unquiesce home area native file system 44 and HAS area native file system 46.

At block 118, the previous snapshot of skeleton file system 48 is scanned, and the scan is utilized to build a reverse map from inode numbers to pathnames. In an alternative embodiment, recorded metadata information is scanned instead of the previous snapshot of skeleton files system 48.

At block 120, an incremental backup of primary storage system 28 is performed, utilizing the current snapshot of skeleton file system 48 and reverse map built at block 118. When the backup software 24 tries to read a file, if there exists a corresponding delta file, then only the updated data in the delta file (plus the backup record to be described later) are returned to the backup software 24. Otherwise, the file's content has not been modified during this backup epoch and no data needs to be backed up.

This significantly reduces the amount of data sent to backup storage system 16 when files/directories are renamed or when large files are partially updated. However, the benefit comes at a cost—restoring files is now a little more complicated. Since the incremental backup does not contain complete contents for a renamed file (or a file under renamed directories) or a partially updated file, we need extra information to know which file needs to be restored from the previous backup and how they should be merged to produce the up-to-date version of the file. More specifically, the system needs to be able to distinguish the following three types of files during a backup/restore: (1) files that are new or completely overwritten; (2) files that are partially updated; and (3) files that are renamed (including renaming of an ancestor directory for a file). The first type of files is the easiest to deal with and no special action needs to be taken. To restore a file belonging to the latter two categories, the system needs to know how to restore the corresponding file from the previous backup. In addition, for a file that is partially overwritten, the system needs the update map to merge the previous version of the file with the new updates.

During the incremental backup, for each file that has been modified within the backup epoch, if its delta file contains the full content of the file (which means either the file is created or is completely overwritten within this backup epoch), no action needs to be taken. Otherwise, the inode number of the file is looked up in the reverse map and obtain the pathname (which is the pathname of the same file in the previous backup). The information about whether a file is backed up with its full content, the path name of the file in the previous backup, and the update map, is called the backup record for that file. A backup record can either be stored in the backed up file (e.g., as a header) or in a standalone data structure. In the latter case, the data structure needs to be retrieved first before files can be restored.

At block 122, the previous skeleton file system snapshot utilized at block 118 is removed.

At block 124, the delta directory and the delta files of the current backup epoch are removed. However, the current snapshot of the skeleton file system or metadata information necessary for the next incremental backup is retained.

At block 126, method 102 ends.

File Restore

In this invention, to restore a file, the full pathname of the file and a time are specified. The restore software (often the same logic 24 handles both backup and restore) tries to retrieve the file from the latest backup that is no later than the specified time in backup storage system 16 using the specified file name.

If the backup is a full backup and the file exists, the file is retrieved and no further action needs to be taken. If the backup is an incremental backup and the file exists, the file is retrieved along with the backup record associated with the file, which was generated during the incremental backup. The backup record contains the following information: (1) whether the file was backed up with its full content during the incremental backup; (2) the path name of the file in the previous backup if the file was not backed up with its full content; (3) if existent, the update map that allows the partial updates recorded in the incremental backup to be merged with the previous version of the file, which can be restored from the backup that immediately precedes the current incremental backup.

If the backup record indicates that the file was not backed up with its full content during the incremental backup. The restore software then tries to restore the previous version of the file using the file name provided in the backup record, which may in turn require restoring an earlier version of the file. The procedure is repeated until an earlier version of the file is restored from a full backup or backed up with its full content in an incremental back as indicated by the associated backup record.

The time it takes to restore a file grows as the number of earlier versions of the file that need to be retrieved from backup storage system 16 increases. One simple approach to reduce the overhead of restoring such a file is to perform a full back after every certain number of incremental backups. This will limit the maximum number of earlier versions of a file that need to be retrieved when restoring the file. Another approach is to have the backup storage system 16 automatically convert files that are not backed up with their full contents in an incremental backup to complete files by merging them with earlier versions of the files using the backup record. To minimize the performance impact on backup operations, files can be converted during idle periods between backup/restore operations on backup storage system 16.

If the purpose to restore the file is to recover the latest version of the file (for example, when home area storage 12 fails) and the HAS area storage 14 is available, the skeleton file system 48 and the delta directory 50 should be checked first to determine whether they contain the complete content of the file. If so, no data needs to be restored from backup storage system 16. If the skeleton file system 48 and the delta directory 50 only contain partial content of the file, the file needs to be first restored from the backup storage system 16 and then merged with the updates of the file stored in the skeleton file system 48 and the delta directory 50.

Protecting Against Local Disaster

The mechanism for supporting incremental backup can be extended to provide asynchronous mirroring over the network. The task of asynchronously syncing up a remote file system includes bringing home area native file system 44 updated, given an up-to-date skeleton file system 48 and current delta directory 50; a previous snapshot of skeleton file system 48 (or the recorded metadata information for that snapshot); and home area native file system 44 (which matches the previous snapshot of skeleton file system 48).

Figure 7:
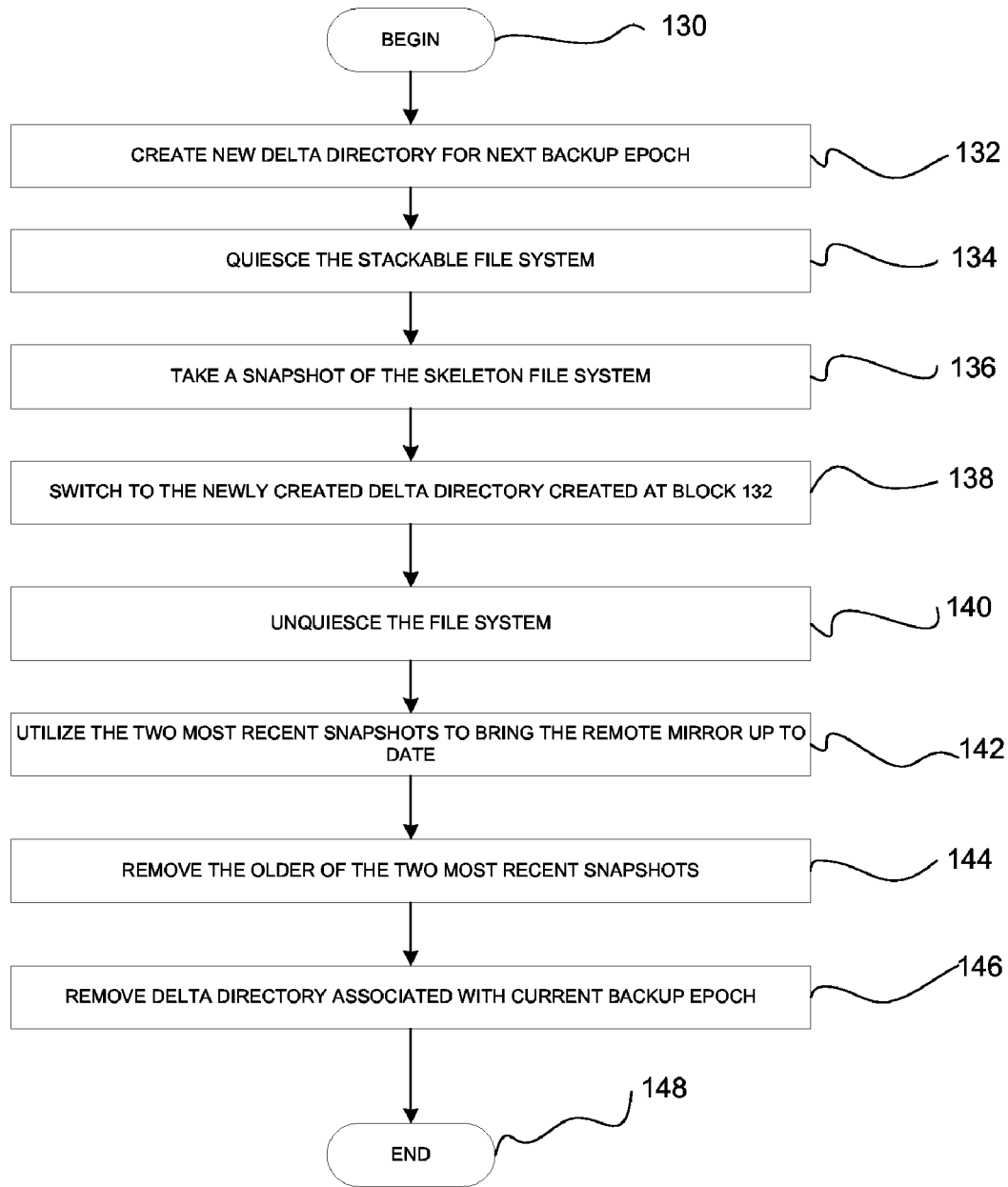
FIG. 7 is a flowchart illustrating a method of utilizing asynchronous remote mirroring to perform incremental backups of a storage system architecture's primary storage system.

FIG. 7 is a flowchart illustrating a method 128 of extending incremental backups of primary storage system 28, to include asynchronous remote mirroring. At block 130, method 128 begins.

At block 132, a new delta directory is created for the next backup epoch.

At block 134, request handler 42 is quiesced which in turn will cause home area native file system 44 and HAS area native file system 46 to be quiesced.

At block 136, take a snapshot of skeleton file system 48.

At block 138, switch to the new delta directory created at block 132.

At block 140, unquiesce the file system.

At block 142, the current snapshot of skeleton file system 48 and the snapshot of skeleton file system 48 which immediately precedes the current snapshot, are utilized to bring the remote mirror up to date.

This is accomplished via the building of a hash table from the preceding snapshot (or the recorded metadata information). The hash table uses the inode numbers as the keys. Each entry in the table contains the name of the file/directory and the inode number of the parent directory (there could more than one parent directories for hard links). Next, the system traverses the up-to-date skeleton file system in preorder. For each file/directory encountered, we lookup the inode number in the hash table. There are two possibilities:

1. The inode number belongs to a newly created file or directory that does not exist in the previous snapshot. Note that the inode number may or may not exist in the hash table. If it exists, it means that the file or directory in the previous snapshot was removed and the inode freed and reallocated. In this case, the system tries to lookup the file/directory using the same pathname in the file system. If such a file/directory exists, it is moved to a special temporary directory (we cannot remove it at this time since it may have been renamed to another file/directory in skeleton file system 34 which we have not reached). The hash table is also updated to reflect the namespace change. If such a file/dir does not exist, then a new one is created with the same attributes. For a file, it's contents are copied over from its delta file.

2. The inode number belongs to an existing file/directory in the previous snapshot. If the two pathnames are different, it means that the file/directory was renamed. A rename operation will then be performed on the live file system to move the file/directory to its new location. Again, the corresponding hash table entry is updated to reflect the name space change. If the inode number points to a file and a delta file exists for the file, then the file is updated. The system also mark the entry in the hash table as "found". Finally, for all the inodes in the hash table that are not marked as "found", the corresponding files/directories are removed from the live file system. Note that for hard links, it is possible that the inode is marked as "found" but some of the namespace entries pointing to the inode should be removed. Therefore, for entries in the hash table that have more than one parent directories, we always verify each name space entry for the inode regardless of whether it is marked as "found".

At block 144, the snapshot of skeleton file system 48 immediately preceding the current snapshot of skeleton file system 48 is removed.

At block 146, the delta directory and the delta files associated with the current backup epoch are removed. The delta directory created at block 132 is retained.

At block 148, method 128 ends.

Fast Restart After Failure

In the preferred embodiment, backup and asynchronous remote copy are done at the logical file level, to get flexibility and to reduce any dependencies on the physical characteristics of different systems. In addition, the disclosed invention enables fast selective restore of individual files as well as preferential restore of files based on their importance. The importance of files can be specified by the user or inferred through attributes such as their creation or last update time. Also, in one embodiment, statistics associated with which files have recently been used or are actively being used, can be colleted, so that those files can be restored first.

Figure 8:
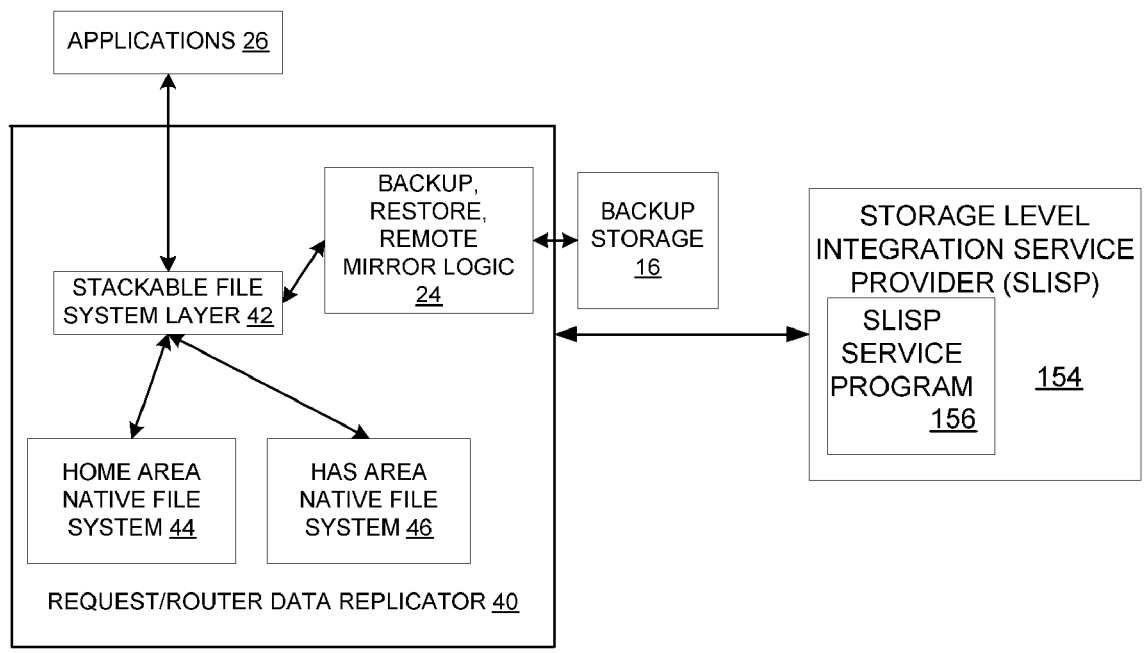
FIG. 8 is a block diagram illustrating a storage system architecture capable of communicating with a storage integration service provider (SLISP)

FIG. 8 is a block diagram illustrating a storage system architecture 10 capable of communicating with a storage level integration service provider (SLISP) 154. SLISP 154 is responsible for providing a customer with the ability to utilize architecture 10, via the SLISP service program 156, for addressing read failures.

Figure 9:
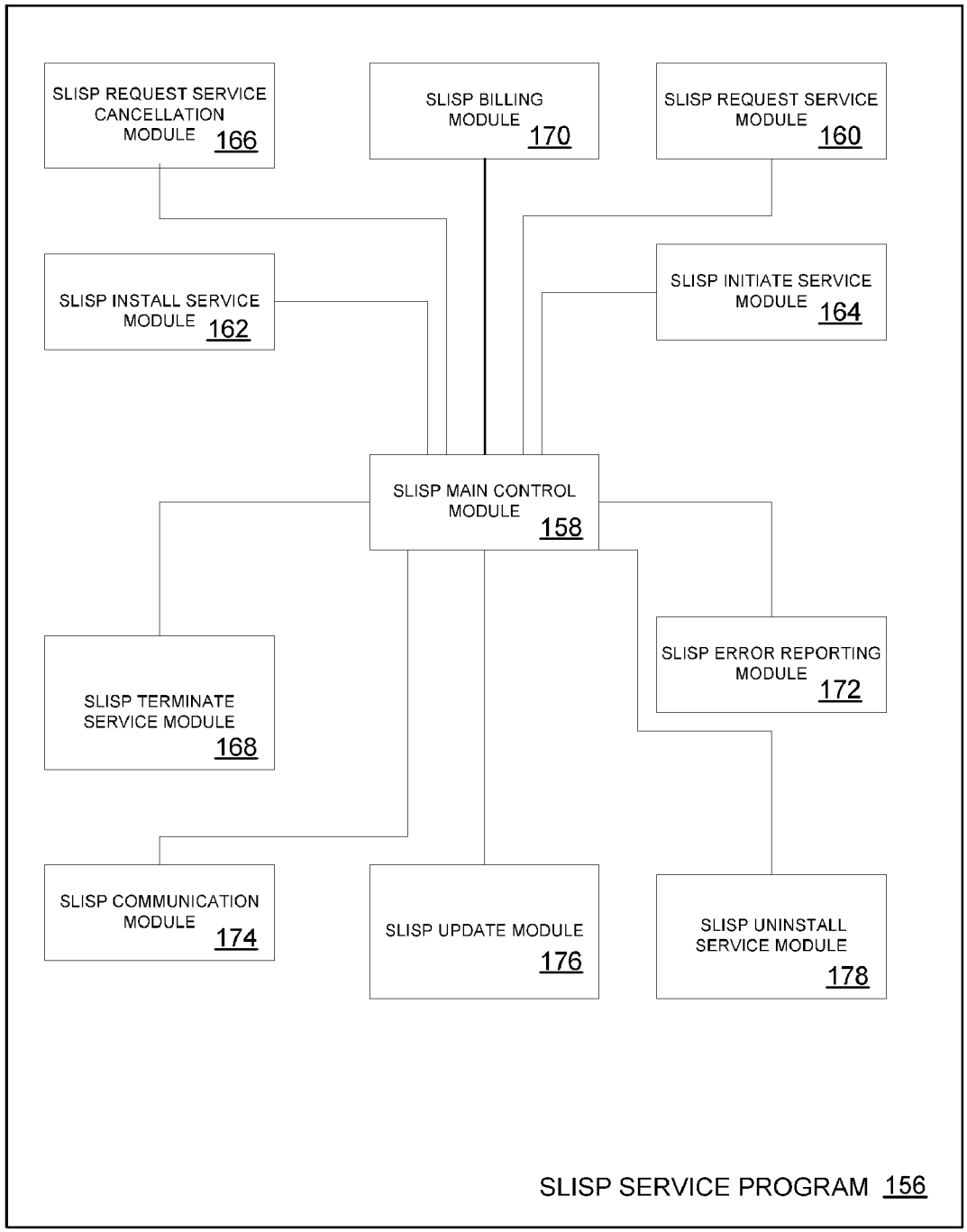
FIG. 9 is a block diagram, illustrating SLISP service program, according to an exemplary embodiment of the invention.

FIG. 9 is a block diagram, illustrating SLISP service program 156, according to an exemplary embodiment of the invention.

SLISP service program 156 includes SLISP main control module 158. SLISP main control module 158 coordinates the functions and interactions of all the modules included within SLISP 156.

SLISP service program 156 includes SLISP request service module 160. The SLISP request service module 160 receives and processes requests to receive services provided by SLISP service program 156.

SLISP service program 156 includes SLISP install service module 162. SLISP install service module 162 is responsible for installing the services provided by SLISP service program 156 within a requesting system. The installation includes installing logic necessary to facilitate communication and interactions with architecture 10.

SLISP service program 156 includes SLISP initiate service module 164. SLISP initiate service module 164 is responsible for negotiating the service agreement with the requestor and initiating the service provided by SLISP service program 156.

SLISP service program 156 includes SLISP request service cancellation module 166. SLISP request service cancellation module 166 is responsible for processing all requests to cancel service provided by SLISP service program 156.

SLISP service program 156 includes SLISP terminate service module 168. SLISP terminate service module 168 is responsible for negotiating the termination of services provided by SLISP service program 156 and making the termination of service effective.

SLISP service program 156 includes SLISP billing module 170. SLISP billing module 170 is responsible for managing all account and billing information between the requester and SLISP service program 156 offered by SLISP 154.

SLISP service program 156 includes SLISP error reporting module 172. SLISP error reporting module 172 is responsible for monitoring SLISP service program 156 within each requestors system and receiving and processing all error messages.

SLISP service program 156 includes SLISP communication module 174. SLISP communication module 174 provides for monitoring and maintaining communications between SLISP service program 156 and architecture 10.

SLISP service program 156 includes SLISP update module 176. SLISP update module 176 facilitates the updating and/or upgrading of the software installed at the customer previously, by SLISP install service module 162.

SLISP service program 156 includes SLISP uninstall service module 178. SLISP uninstall service module 178 is responsible for uninstalling software installed at the customer previously, by SLISP install service module 162. Uninstall might be necessary upon termination of a requestor's service.

Thus, a system and method for reliably storing data in a computer system. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for reliably storing data in a computer system, comprising:
   receiving a piece of data to be stored at a storage system:
   writing a first copy of the data to the storage system according to a first data redundancy scheme;
   writing a second copy of the data to the storage system according to a second data redundancy scheme;
   maintaining metadata of the data written to the storage system according to the second data redundancy scheme;
   copying the data written to the storage system according to the second data redundancy scheme to a backup storage system, wherein the copying is performed in response to a defined condition being met; and
   removing the data written to the storage system according to the second data redundancy scheme after it has been copied to the backup storage system,
   wherein the stored data includes both blocks of user data and attributes such as file names that are associated with collections of user data, and
   wherein the metadata is maintained by using a skeleton file system that replicates all the namespace and attribute information of the stored data and a set of delta files each of which records all the data updates that have been made to a corresponding file and that have not been copied to the backup storage system.

2. A method for reliably storing data in a computer system, comprising:
   receiving a piece of data to be stored at a storage system;
   writing a first copy of the data to the storage system according to a first data redundancy scheme;
   writing a second copy of the data to the storage system according to a second data redundancy scheme;
   maintaining metadata of the data written to the storage system according to the second data redundancy scheme;
   copying the data written to the storage system according to the second data redundancy scheme to a backup storage system, wherein the copying is performed in response to a defined condition being met; and
   removing the data written to the storage system according to the second data redundancy scheme after it has been copied to the backup storage system,
   wherein the method further comprises recognizing a failure in the storage system which compromises the reliability of the data stored according to the first data redundancy scheme, and
   wherein rebuilding an accurate copy of the data stored according to the first data redundancy scheme comprises utilizing the maintained metadata as a blueprint for combining data retrieved from the backup storage system and data remaining in the store system.

3. The method of claim 2 wherein data remaining in the storage system comprises data stored according to the second data redundancy scheme.

4. A disaster recovery system, comprising:
   a plurality of disks;
   a storage controller attached to the disks, wherein the storage controller receives data to be stored on the plurality of physical disks;
   first data redundancy scheme logic included within the storage controller for writing a copy of the data received by the storage controller to the physical disks according to a first data redundancy scheme;
   second data redundancy scheme logic included within the storage controller for writing a second copy of the data received by the storage controller to the physical disks according to a second data redundancy scheme;
   metadata of the data written to the storage system according to the second data redundancy scheme;
   data backup logic to copy the data written to the storage system according to the second data redundancy scheme to a backup storage system, wherein the copying is performed in response to a defined condition being met; and
   maintenance logic to remove the data written to the storage system according to the second data redundancy scheme after it has been copied to the backup storage system,
   wherein the stored data includes both blocks of user data and attributes such as file names that are associated with collections of blocks of user data,
   wherein the metadata is maintained by using a skeleton file system that replicates all the namespace and attribute information of the stored data and a set of delta files each of which records all the data updates that have been made to a corresponding file and that have not been copied to the backup storage system.

5. A disaster recovery system, comprising:
   a plurality of disks;
   a storage controller attached to the disks, wherein the storage controller receives data to be stored on the plurality of physical disks;

first data redundancy scheme logic included within the storage controller for writing a copy of the data received by the storage controller to the physical disks according to a first data redundancy scheme;

second data redundancy scheme logic included within the storage controller for writing a second copy of the data received by the storage controller to the physical disks according to a second data redundancy scheme;

metadata of the data written to the storage system according to the second data redundancy scheme;

data backup logic to copy the data written to the storage system according to the second data redundancy scheme to a backup storage system, wherein the copying is performed in response to a defined condition being met; and maintenance logic to remove the data written to the storage system according to the second data redundancy scheme after it has been copied to the backup storage system, wherein the system further comprises monitoring logic to recognize a failure in the storage system which compromises the reliability of the data stored according to the first data redundancy scheme;

wherein the system further comprises responding to the failure by rebuilding an accurate copy of the data stored according to the first data redundancy scheme, and wherein rebuilding an accurate copy of the data stored according to the first data redundancy scheme comprises, utilizing the maintained metadata as a blueprint for combining data retrieved from the backup storage system and data remaining in the storage system.

6. The system of claim 5 wherein data remaining in the storage system comprises data stored according to the second data redundancy scheme.

7. A method for deploying a disaster recovery service in a computer system, comprising:

integrating computer readable code into a system for receiving a piece of data to be stored at a storage system;

integrating computer readable code into a system for writing a first copy of the data to the storage system according to a first data redundancy scheme;

integrating computer readable code into a system for writing a second copy of the data to the storage system according to a second data redundancy scheme;

integrating computer readable code into a system for maintaining metadata of the data written to the storage system according to the second data redundancy scheme;

integrating computer readable code into a system for copying the data written to the storage system according to the second data redundancy scheme to a backup storage system, wherein the copying is performed in response to a defined condition being met; and integrating computer readable code into a system for removing the data written to the storage system according to the second data redundancy scheme after it has been copied to the backup storage system, wherein the stored data includes both blocks of user data and attributes such as file names that are associated with collections of blocks of user data, and wherein the metadata is maintained by using a skeleton file system that replicates all the namespace and attribute information of the stored data and a set of delta files each of which records all the data updates that have been made to a corresponding file and that have not been copied to the backup storage system.

8. A method for deploying a disaster recovery service in a computer system, comprising:

integrating computer readable code into a system for receiving a piece of data to be stored at a storage system;

integrating computer readable code into a system for writing a first copy of the data to the storage system according to a first data redundancy scheme;

integrating computer readable code into a system for writing a second copy of he data to the storage system according to a second data redundancy scheme;

integrating computer readable code into a system for maintaining metadata of the data written to the storage system according to the second data redundancy scheme;

integrating computer readable code into a system for copying the data written to the storage system according to the second data redundancy scheme to a backup storage system, wherein the copying is performed in response to a defined condition being met; and integrating computer readable code into a system for removing the data written to the storage system according to the second data redundancy scheme after it has been copied to the backup storage system, method further comprising integrating computer readable code for recognizing a failure in the storage system which compromises the reliability of the data stored according to the first data redundancy scheme, and wherein rebuilding an accurate copy of the data stored according to the first data redundancy scheme comprises utilizing the maintained metadata as a blueprint for combining data retrieved from the backup storage system and data remaining in the storage system.

9. The method of claim 8 wherein data remaining in the storage system comprises data stored according to the second data redundancy scheme.

* * * * *